F. B. MARTIN.
FLAP FOLDING AND SEALING MACHINE.
APPLICATION FILED AUG. 10, 1911.
1,136,353.
Patented Apr. 20, 1915.
9 SHEETS—SHEET 2.
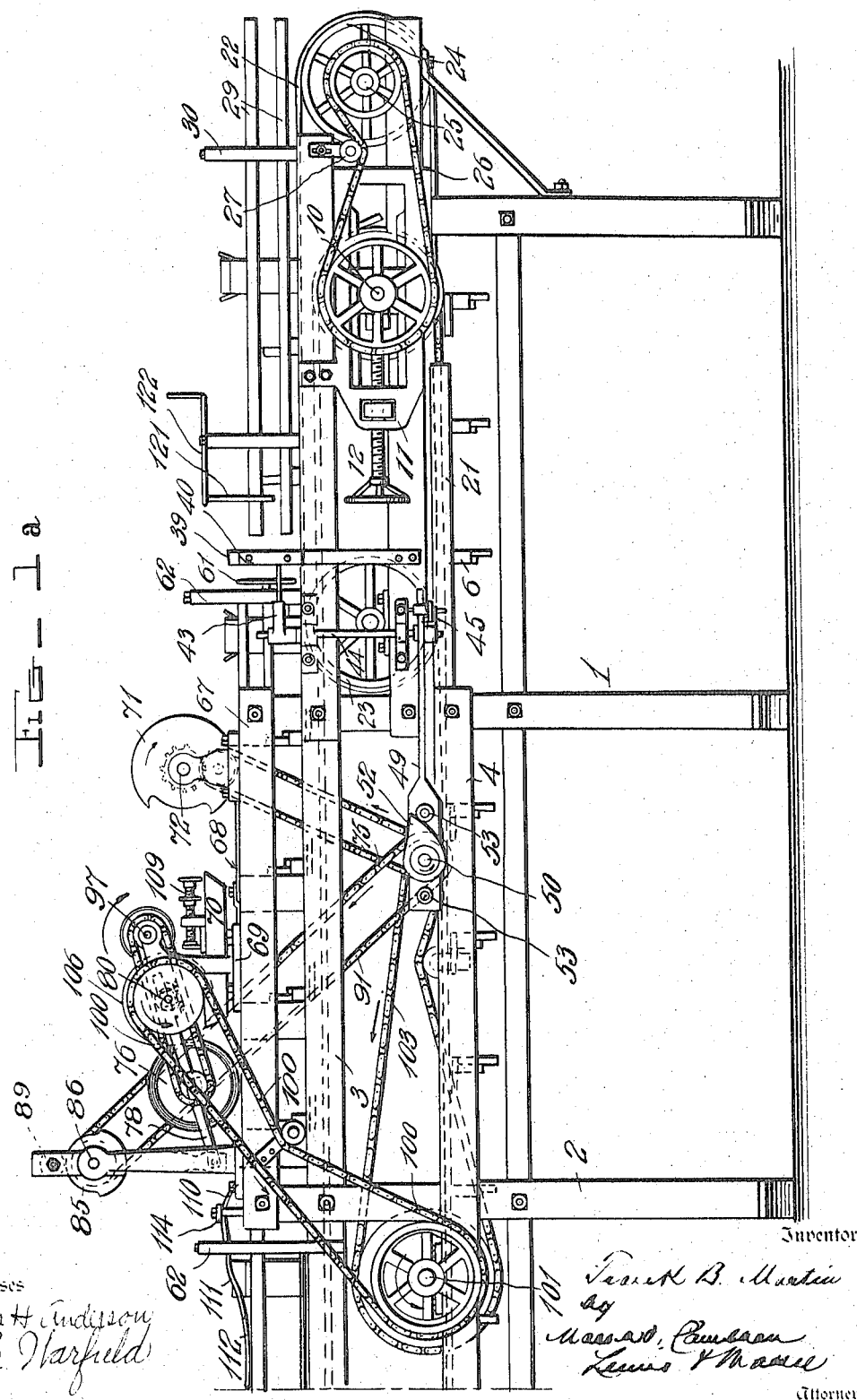

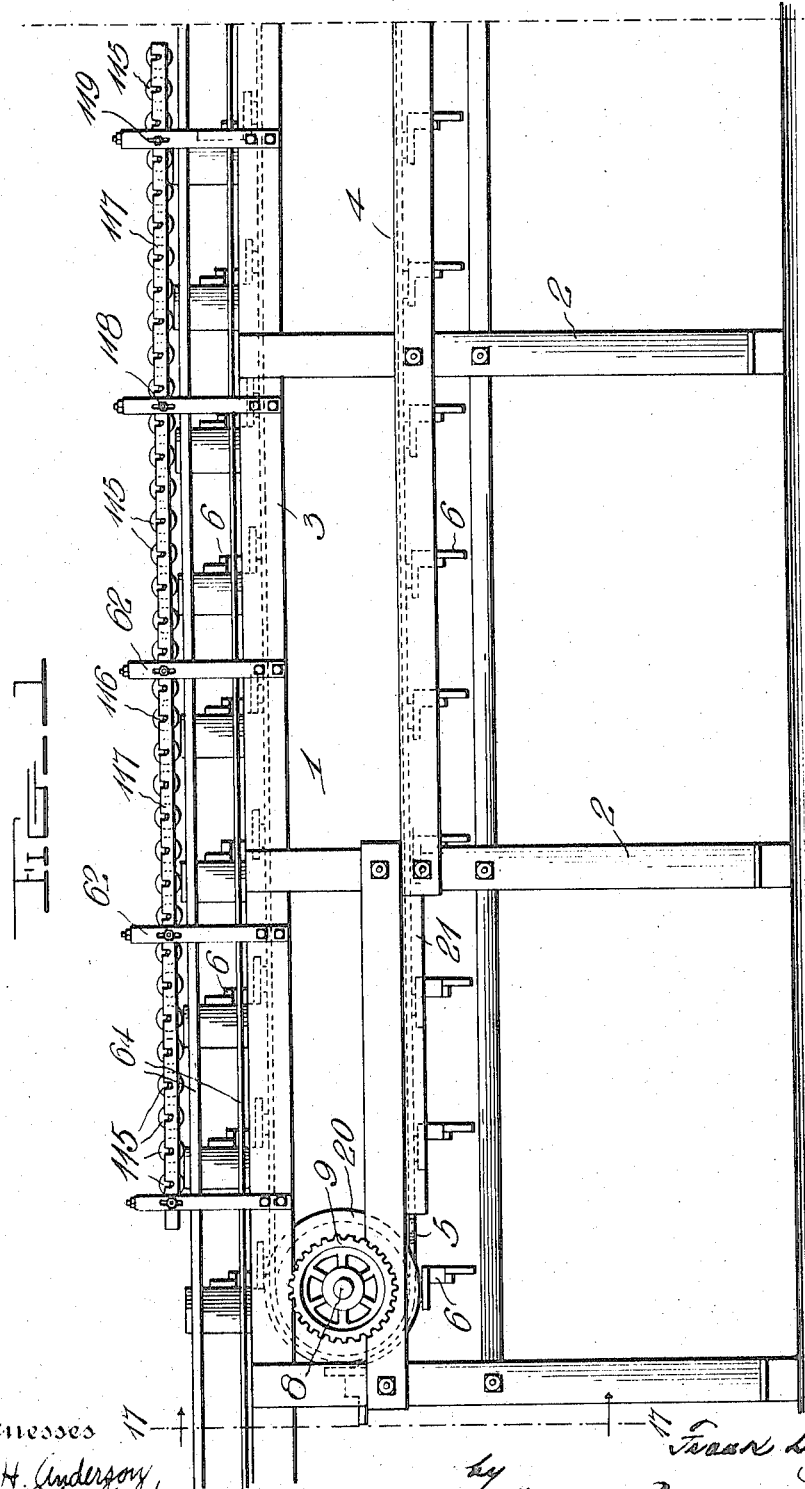

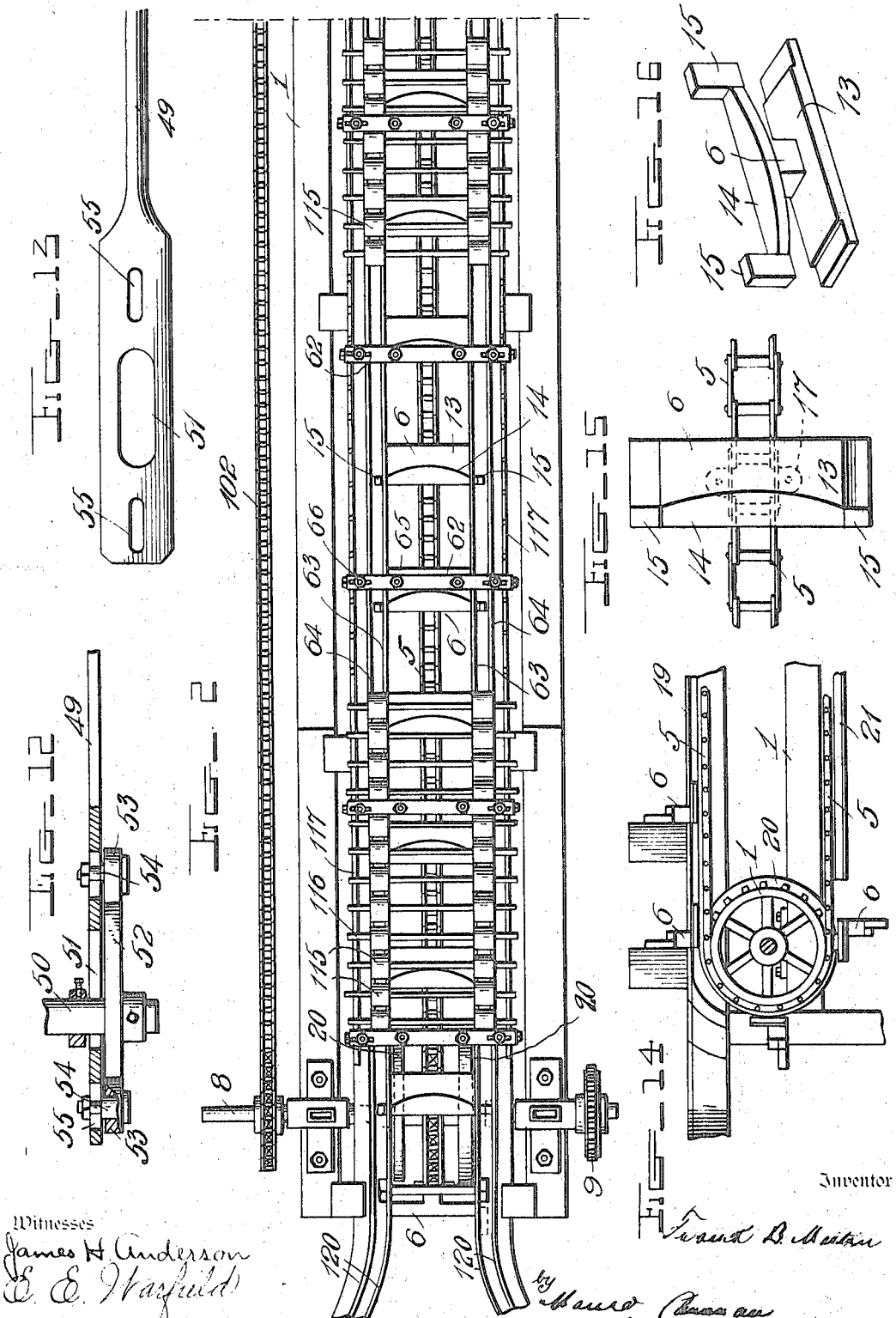

F. B. MARTIN.
FLAP FOLDING AND SEALING MACHINE.
APPLICATION FILED AUG. 10, 1911.
1,136,353. Patented Apr. 20, 1915.
9 SHEETS—SHEET 4.
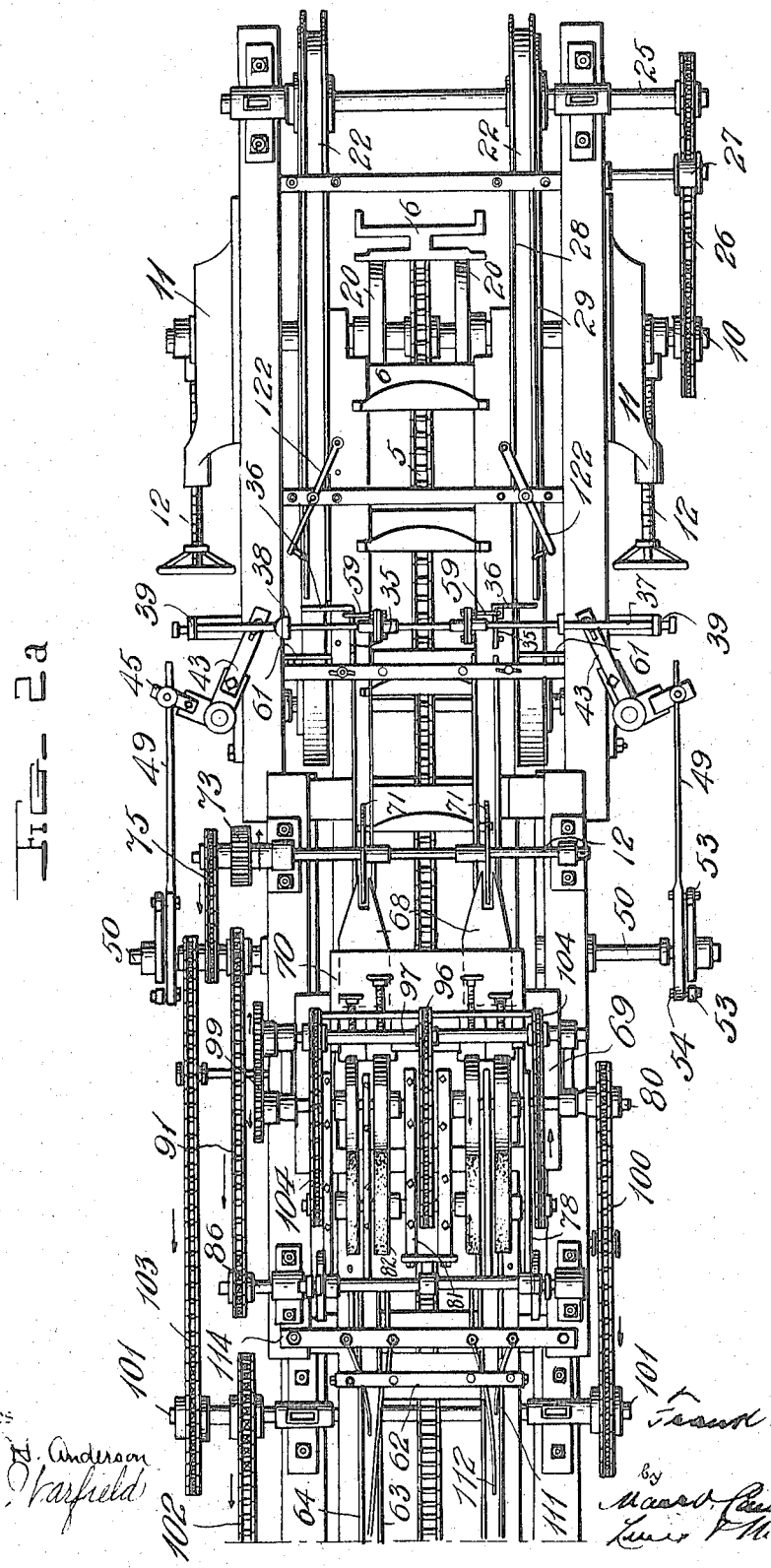

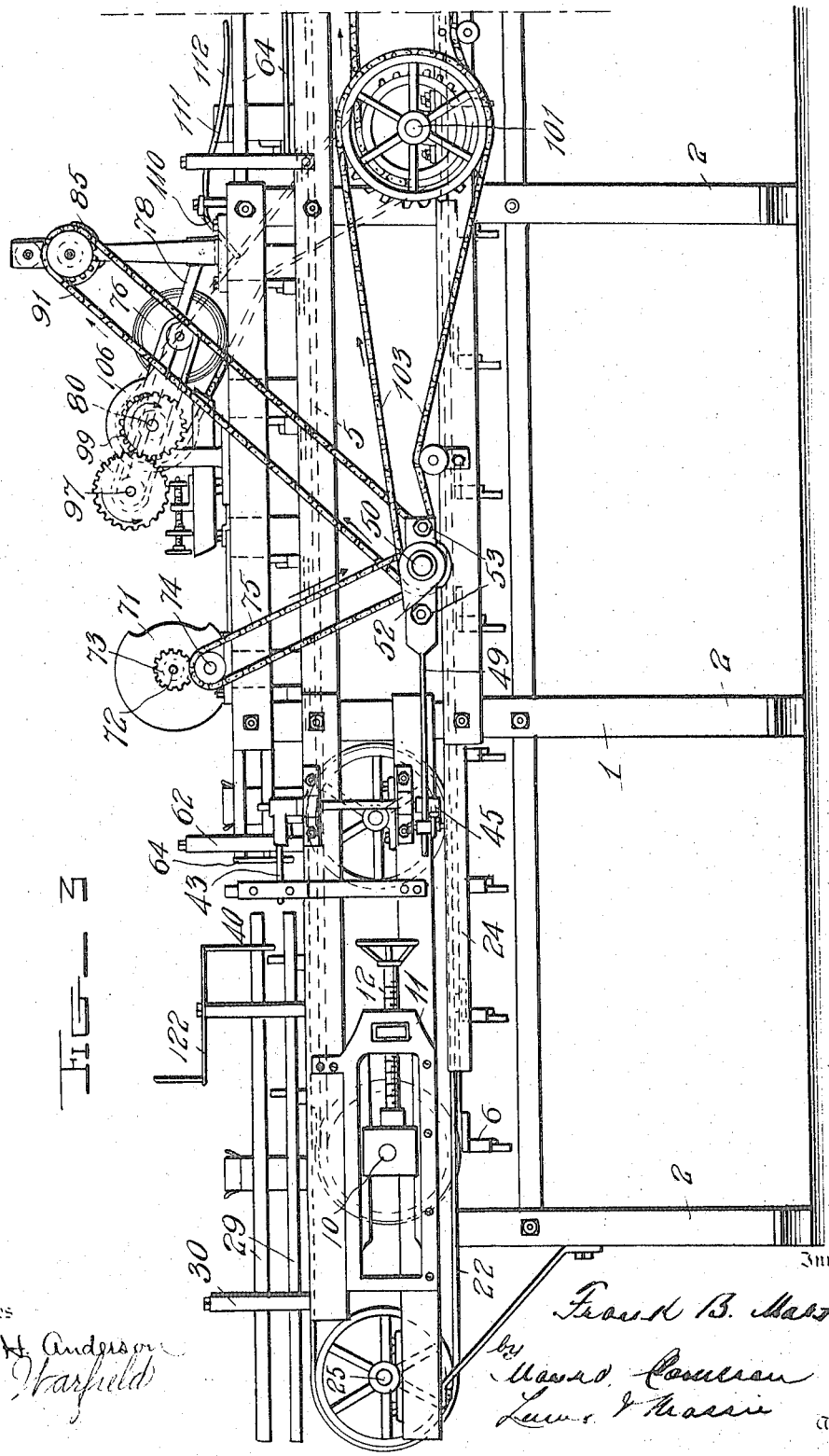

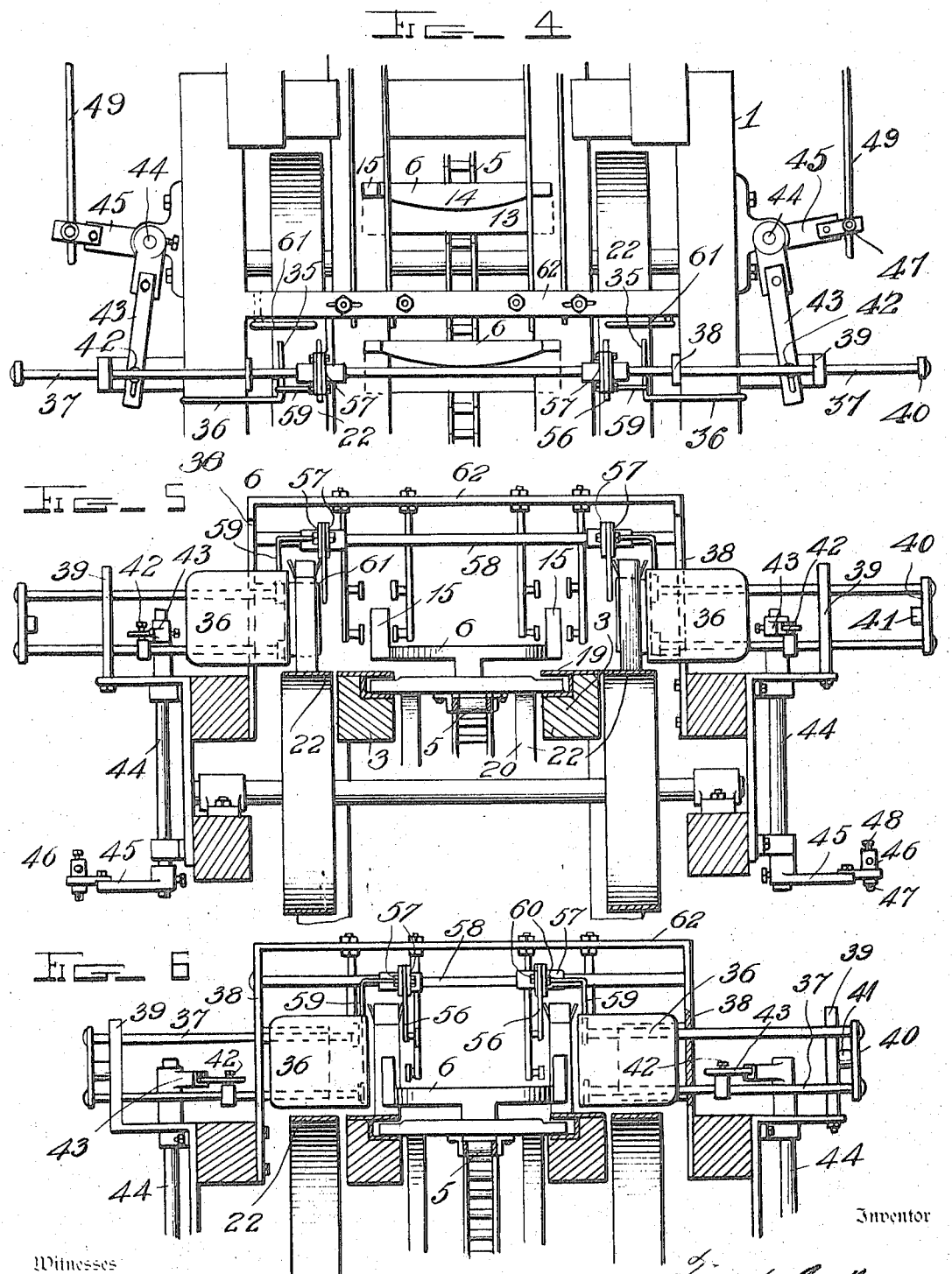

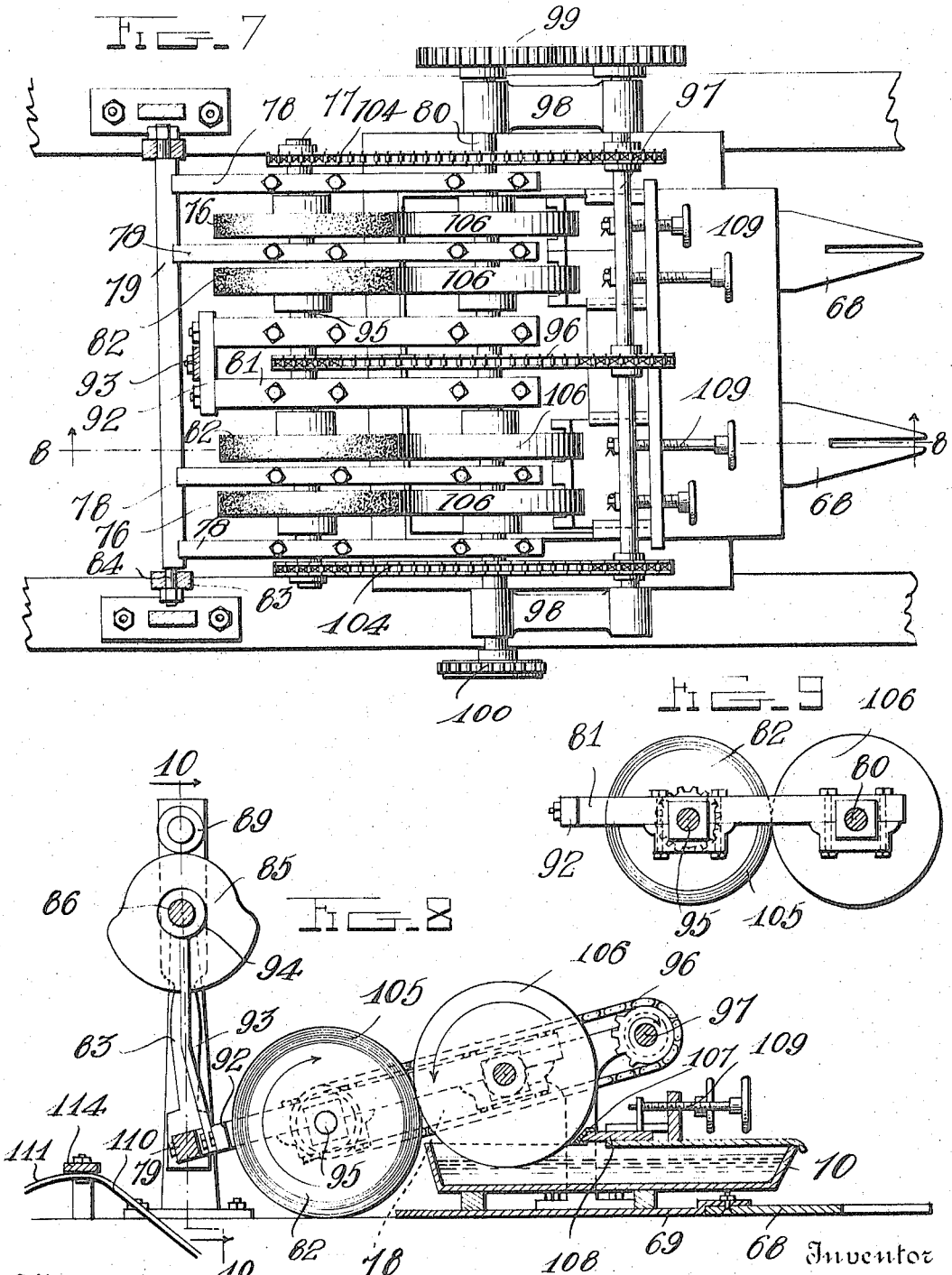

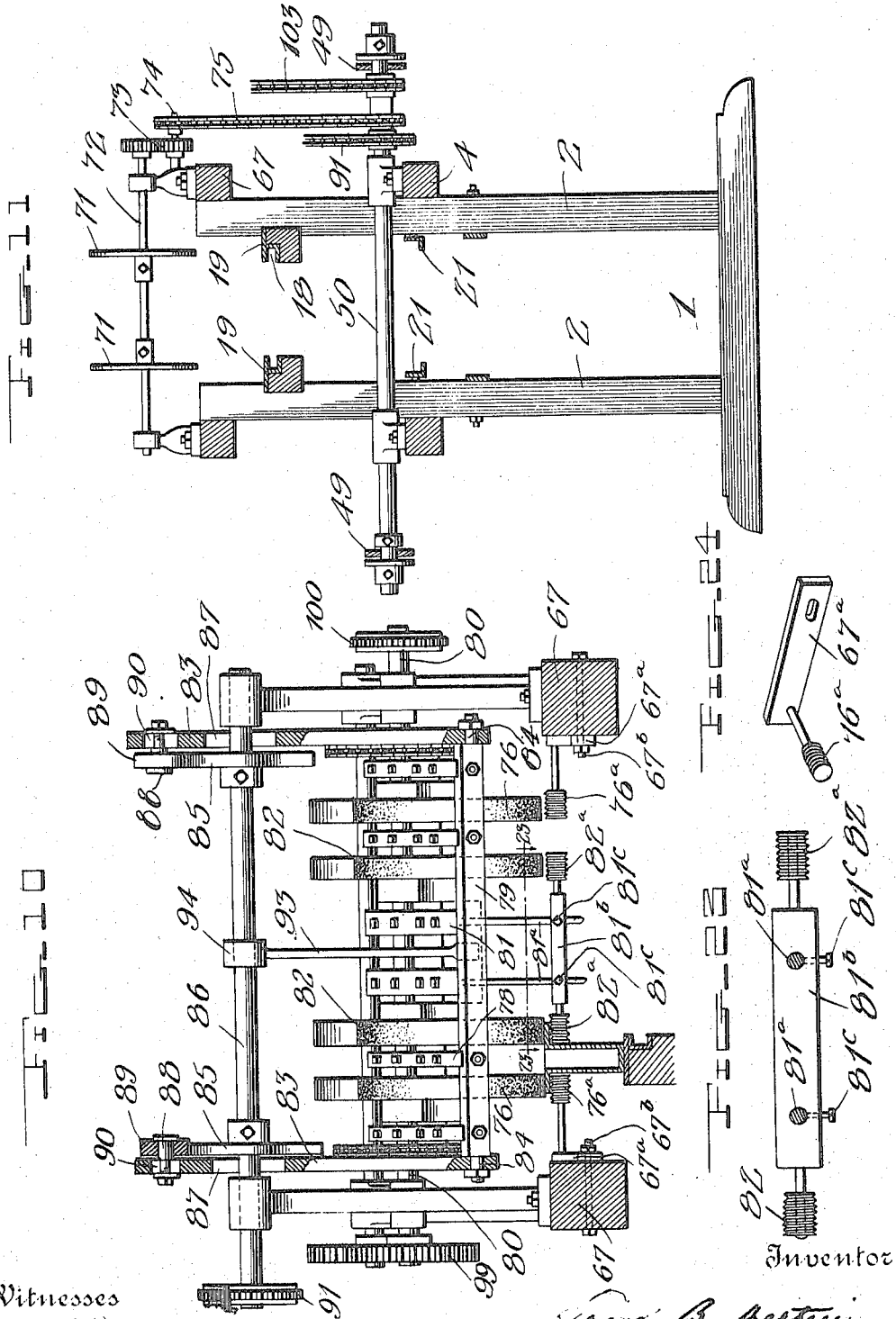

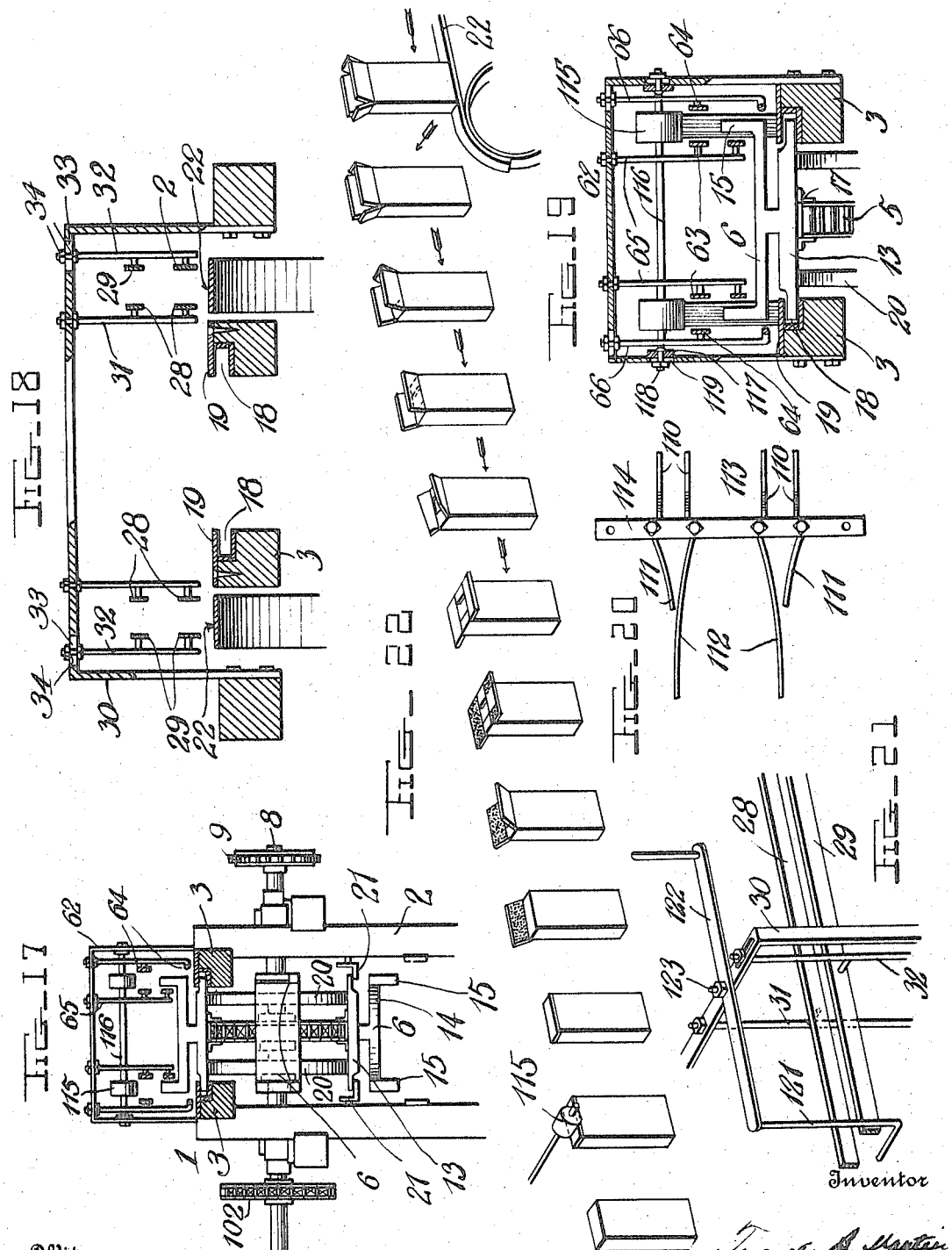

UNITED STATES PATENT OFFICE.

FRANK B. MARTIN, OF BATTLE CREEK, MICHIGAN, ASSIGNOR TO POSTUM CEREAL CO., LTD., OF BATTLE CREEK, MICHIGAN, A PARTNERSHIP ASSOCIATION OF MICHIGAN.

FLAP FOLDING AND SEALING MACHINE.

1,136,353.     Specification of Letters Patent.     Patented Apr. 20, 1915.

Original application filed October 27, 1910, Serial No. 589,426. Divided and this application filed August 10, 1911. Serial No. 643,459.

*To all whom it may concern:*

Be it known that I, FRANK B. MARTIN, of Battle Creek, Michigan, have invented a new and useful Improvement in Flap Folding and Sealing Machines, which invention is fully set forth in the following specification.

This invention relates to improvements in machines for folding and sealing the flaps of cartons or other receptacles, and more particularly to a machine for folding and sealing the top flaps of filled cartons set forth in my pending application Serial No. 589,426 filed October 27, 1910, of which the present application is a division.

One of the objects of the invention is to produce a machine for sealing cartons which shall have a maximum capacity while at the same time occupying the smallest possible floor space in the factory. Machines of this character are necessarily large and it is a matter of prime importance to reduce the floor space occupied by the same to the lowest possible extent.

A further object is to produce a machine which, in proportion to the number of cartons sealed thereby, shall require the smallest possible number of operatives to attend to the same; and, further, to produce a machine which shall be simple in construction, thereby reducing the first cost of the machine and liability of the machine to get out of order.

With these objects in view, the invention consists of a carton-sealing machine provided with carton-flap-securing devices acting in conjunction with two parallel carton-supporting and guiding channels for directing the cartons past said devices in combination with a single continuously-moving conveyer simultaneously advancing the cartons through the two channels by means of uniformly spaced followers secured to the conveyer and moving in the channels, and means for feeding the cartons in front of the followers on the conveyer.

In many cartons, the two flaps which are first folded in do not extend entirely across the surface of the top of the carton, and, if glue were placed upon the entire under surface of the flap of the carton which lies immediately over the two inner flaps, the glue would be liable to come in contact with the contents of the carton, which is undesirable, and, with a view of avoiding this, the invention further consists in means for applying the glue to such flap only on those portions of the flap that extend over the area of the two inner flaps, leaving that portion of said flap which is exposed to the interior of the carton without any glue thereon. One means of accomplishing this in the present instance is by providing a roller bearing the glue or other adhesive which reciprocates so that it is brought in contact with one part of the flap, is then raised therefrom and again descends upon another part of the flap, thereby applying the glue to the desired portions only and omitting glue, as above stated, from that portion which is exposed to the contents of the carton.

The invention further consists in certain features of novelty in construction and in the combination and arrangement of parts hereinafter more fully described and claimed and illustrated in the accompanying drawings.

It will be understood that the inventive idea involved is capable of receiving a variety of mechanical expressions, one of which, for the sake of illustrating the invention, is shown in the accompanying drawings, but it is to be expressly understood that the invention is not limited to the specific form chosen for illustration, the limits of the invention being as broad as the appended claims.

In the drawings—Figures 1 and 1ª are side views of the machine, Fig. 1ª being a continuation of Fig. 1; Figs. 2 and 2ª are plan views of the parts shown in Figs. 1 and 1ª, respectively, some of the sealing rollers being omitted in Fig. 2; Fig. 3 is a side elevation of the right side of the front end portion of the machine; Fig. 4 is an enlarged detail plan view showing the mechanism for shifting the cartons laterally from the feeding belts to the supporting plates; Figs. 5 and 6 are detail transverse sectional views through the parts shown in Fig. 4, the lateral push members being shown in retracted position in Fig. 5 and in inwardly projected position in Fig. 6; Fig. 7 is a detail plan view with parts in section, of the glue-applying mechanism; Fig. 8 is a detail section taken on line 8—8 of Fig. 7; Fig. 9 is a detail sectional view showing two of the glue-applying rollers and their supporting frame; Fig. 10 is a detail vertical section taken on line 10—10 of Fig. 8; Fig. 11 is an incomplete detail cross sectional view through a portion of the main frame showing the construction and arrangement of certain of the parts; Fig. 12 is a detail horizontal section through one of the links or rods which operate the lateral push members; Fig. 13 is a side view of one end of the link or rod shown in Fig. 12; Fig. 14 is a detail sectional view through the rear or discharge end of the main conveyer or carrier; Fig. 15 is a plan view of one of the carton followers and a portion of the main conveyer chain; Fig. 16 is a detail perspective view of one of the followers; Fig. 17 is a detail cross sectional view taken on line 17—17 of Fig. 1; Fig. 18 is a detail cross sectional view showing the manner of mounting the carton guide rails at the front or receiving end of the machine; Fig. 19 is a similar cross sectional view showing the manner of mounting the carton guiding rails at the central portion and discharge end of the machine; Fig. 20 is a detail plan view showing the side flap elevating and folding devices; Fig. 21 is a detail perspective view showing a hand-actuated stop which may be used over the feed belts at the front end of the machine for stopping the feeding of cartons to the lateral push members; Fig. 22 is a diagrammatic view illustrating the manner in which the cartons are folded and sealed; Fig. 23 is a detail sectional view taken on the line 23—23 in Fig. 10; and Fig. 24 is a detail perspective view of one of the corrugated flap-supporting rollers and the bracket which carries it.

Referring more particularly to the drawings, 1 denotes a main frame on which the carton-feeding, flap-folding and sealing mechanisms are mounted and which may be of any suitable form and construction. As illustrated, it preferably comprises the uprights 2, supporting upper side-bars 3 and lower side-bars 4. Other connecting bars and braces are also preferably employed, as illustrated, to provide a rigid supporting structure.

Arranged to travel longitudinally through the main frame is a main carrier or conveyer, preferably in the form of a sprocket chain 5, having connected to it at intervals, carton followers 6. The chain 5 is centrally arranged and has its upper stretch traveling between the upper side-bars 3 (see Fig. 5). It passes around a sprocket wheel 7 fixed to a main drive shaft 8 disposed transversely at the rear end of the main frame and journaled in suitable bearings. Power may be applied to this shaft 8 by means of a chain passing around a driving sprocket wheel 9 or by any other suitable means. At the front end of the frame (Figs. 1ª and 2ª), the main conveyer chain 5 passes around a sprocket wheel on a transverse shaft 10 journaled in bearings which are slidable in guide brackets 11 and adjusted by means of screws 12. These adjustable bearings permit the chain to be tightened when necessary.

Each of the followers 6 (Figs. 15 and 16) comprises a central portion at one end of which is provided a transverse plate 13 and at the other end a cross head 14, the extremities of which latter are provided with carton-engaging arms or wings 15. The plates 13 are secured centrally to the chain 5, as shown at 17 in Fig. 15, and their ends are reduced to travel through track-ways or grooves 18 provided in the side-bars 3, as shown more clearly in Figs. 18 and 19. These track-ways are lined with metal wear plates and their upper portions are formed by carton-supporting plates 19, which are secured to the upper surfaces of the bars 3 and upon which the cartons slide as they are fed through the machine. By this construction and arrangement, the follower 6 travels between the upper side-bars of the main frame and is effectively supported by the engagement of its plate 13 with the track-ways or grooves 18 while the arms or wings 15 on the ends of the cross head 14 engage one carton in each of the rows and simultaneously move such cartons over the supporting plates 19. To support the ends of the plates 13 as the conveyer chain 5 passes around the sprocket wheels at the ends of the main frame, circular supporting plates 20 are fixed to the shafts 8 and 10 as shown in Figs. 2, 2ª and 17; and to support the lower or return stretch of the conveyer chain 5, angle metal supporting-rails 21 are secured to the uprights 2 or other portions of the main frame for the reception of the ends of the plates 13 (see Figs. 1 and 17).

At the front end of the supporting frame, I provide two endless feed conveyers, here shown as belts 22, and means for simultaneously shifting the cartons from these feed conveyers to the plates 19 in advance of the followers 6. The two belts 22 have their upper stretches disposed horizontally alongside of the receiving ends of the plates 19, and in the plane of the same. The belts pass around pulleys 23, 24 (Fig. 1ª), the pulleys 24 being driving pulleys fixed to a transverse shaft 25 journaled in suitable bearings on the main frame and driven from the shaft 10 by sprocket chain gearing 26, a suitable tightening pulley 27 being provided to permit the sprocket chain 26 to be tightened after adjustment of the shaft 10.

The cartons are placed, manually or otherwise, on the forward portions of the feed belts 22 between opposing guide members or rails 28—29, which are preferably arranged in pairs and carried by inverted U-shaped frame members 30 secured to the main frame as shown in Fig. 18. The inner guide rails 28 are stationary and fixed to hanger bolts 31 depending from the frame members 30. The outer guide rails 29 are adjustable toward and from the rails 28 to permit cartons of different sizes to be handled by the machine, this adjustment of said rails being preferably effected by fixing them to hangers 32 which are adjustable in slots 33 in the frame members 30, clamping nuts 34 being provided on the threaded ends of the hangers 32, as shown in Fig. 18.

The mechanism for shifting the cartons from the feed belts 22 on to the supporting plates 19, shown in Figs. 2ª and 4 to 6, comprises two laterally reciprocating push members 35 which operate in unison so that they simultaneously push one carton from each feed belt on to the coacting supporting plate. These push members are in the form of angular plates which have longitudinally-extending portions to engage the cartons and push same inwardly or laterally upon the supporting plates and outwardly-projecting transverse portions 36 which latter serve as stop flanges to stop the streams of cartons on the feed belts while one carton from each belt is being pushed laterally upon the plates. These angular push members 35 are fixed to the inner ends of transverse bars or rods 37 mounted to reciprocate in inner and outer bearing posts 38—39 and having their outer ends connected by upright bars 40, which latter preferably carry buffers 41 to engage the bearing posts 39 and cushion the inward movement of the push members. The lower rods 37 on each side of the machine carry adjustably-mounted pivots 42 which are engaged by the slotted outer ends of arms 43 fixed to the upper extremities of upright shafts 44 journaled in suitable bearings on the main frame. The lower ends of the shafts 44 are provided with radial arms 45 carrying at their outer extremities blocks 46 which are pivotally mounted at 47, see Fig. 5.

The blocks 46 are formed with transverse openings in which are adjustably secured, by means of set screws 48, the reduced forward ends of connecting links or rods 49. These rods 49 have enlarged flat rear ends, as shown in Figs. 12 and 13, and they are slidably supported on a transverse shaft 50, Fig. 1ª, the intermediate portion of which is journaled in bearings on the lower side bars 4 of the main frame and the end portion of which projects through elongated openings or slots 51 formed in said rods 49. Fixed to the ends of the shaft 50, adjacent the rods 49, are cams 52, Fig. 12, which engage and actuate anti-friction rollers 53 carried by the rods 49 on opposite sides of the slots 51. The rollers 53 are mounted on adjustable journals 54, which latter are clamped in slots 55 formed in the rods 49.

By this construction, when the shaft 50 is rotated, the cams 52 will reciprocate the links or rods 49 in unison to rock the upright shafts 44 and the motion of the latter will be imparted to the push members 35, the latter reciprocating in opposite directions in unison.

For the purpose of preventing the cartons from being tilted and thrown over on their sides when they are pushed from the feed belts on to the supporting plates 19, I provide guard members 56 which are carried by push members 35 and spaced therefrom a distance sufficient to receive the cartons. The guard members 56 are in the form of vertically-disposed plates having their upper ends clamped between flanged sleeves 57 which are slidably arranged on a transverse supporting rod 58 uniting the upper extremities of the two inner uprights 38. The flanged sleeves 57 receive the guard members 56 between them and they are bolted together and connected by angular arms 59 to the push members 35, as clearly shown in Figs. 4 and 5. The angular arms 59 have their inwardly extending horizontal branches serving as one of the fastening bolts uniting the co-acting flanged sleeves 57, adjusting nuts 60 being provided on said arms 59 to adjustably connect the parts whereby each guard plate 56 may be adjusted toward and from the co-acting push member.

In order to stop the front cartons on the belts 22 in front of the push members 35 when the latter are in their retracted positions shown in Fig. 4, I provide upright stop members or plates 61, Figs. 1ª and 2ª, fixed in the upright portions of one of a series of inverted U-shaped frame members 62, which latter are similar to the frame members 30 and are arranged at intervals along the upper portion of the main frame for the purpose of supporting carton guiding rails and other parts.

The means for guiding the cartons along the supporting plates 19 are similar to the guiding devices described above in connection with the belts 22, and each one consists of pairs of superposed guide rails or rods 63 and 64 shown in Figs. 2, 2ª and 19. The inner guide rails 63 are in the form of flat bars fixed to depending hanger bolts 65 in the frame members 62, as clearly shown in Fig. 19. The outer guide rails 64 are adjustably mounted, the upper one being preferably a flat bar, and the lower one preferably a rod disposed in a plane slightly above the adjacent carton supporting plate 19. These outer guide rails or rods 64 are fixed to adjustable hanger bolts 66, the upper ends of which are adjustable in slots in the frame members 62, as clearly shown in Fig. 19. Owing to this adjustment, the space between the guide rails may be varied to permit the machine to operate on different sized cartons.

Mounted on elevated side bars 67, Fig. 1ª, above the intermediate portion of the main frame are devices for successively folding the end and side flaps of the cartons and applying glue to certain portions of the side flaps before they are folded upon the end flaps. The first or foremost end flap is folded by the tapered forward end of a folding plate 68, the rear portion of which serves to open the two side flaps outwardly into horizontal position so that glue may be readily applied to the inner upturned faces of said side flaps. These combined end-flap-folding and side-flap-spreading members are arranged horizontally between and in a plane slightly above the guide rails 63—64 and are fixed to a horizontal supporting plate 69 which also supports a glue tank or receptacle 70.

The means for folding the rear end flaps are here shown in the form of rotating disks 71 having notched peripheries to engage and fold the flaps. These disks 71 are mounted on a transverse shaft 72 journaled in bearings on the forward ends of the bars 67 and having one of its ends connected by meshing gears 73 to a short counter shaft 74, Fig. 3, which latter is connected by a sprocket chain gearing 75 to the transverse shaft 50. These end-flap-folding disks 71 are preferably arranged to operate in notches in the tapered forward extremities of the combined first end-flap-folding and side-flap-spreading plates 68 and they are so timed that they will fold down the second end-flaps immediately after the first flaps are folded.

In order to prevent any glue from coming in contact with the contents of the cartons, I provide two pairs of glue-applying rollers and so arrange and mount them that the outer roller of each pair will be oscillated vertically to apply glue to only the end portions of the outer side-flaps of the cartons, while the inner rollers of each pair will apply glue over the entire surface of the inner side-flaps. In connection with this arrangement of glue-applying rollers, I also provide means for first folding the outer side-flaps inwardly and downwardly so that the glue in their end portions will cause them to adhere to the folded end-flaps and the inner side-flaps are then folded to cause them to adhere to the outer or upper faces of the first folded side-flaps.

The oscillating glue-rollers 76 are fixed to short transverse shafts 77, as shown in Fig. 7, journaled in bearings on spaced longitudinal bars 78 of a vertical swinging or oscillating frame. This frame also comprises a transverse connecting bar 79, to which the bars 78 are fastened, as shown in Fig. 7, and said frame swings from a transverse shaft 80, upon which the bars 78 are hung. This swinging or oscillating frame surrounds a relatively stationary frame 81, which carries the inner glue-applying rollers 82 and the free end of the oscillating frame is supported and operated by upright links or rods 83, the lower ends of which are apertured to receive pivots 84 formed on the extremities of the cross-bar 79, see Figs. 7 and 10. The upper ends of the links 83 are actuated by cams 85 fixed to a transverse shaft 86 journaled in suitable bearings on the main frame. The links 83 are guided by forming them with elongated openings or slots 87 which receive the shaft 86 and their upper extremities carry pins or studs 88 for the purpose of supporting anti-friction rollers 89 to ride on the cams 85. The studs 88 are preferably adjustably mounted by clamping them in slots 90 in the upper ends of the links 83, as clearly shown in Fig. 10. One end of the shaft 86 is connected by sprocket chain gearing 91 to the counter shaft 50 so that when the latter is rotated, the cams 85 will cause the links 83 to raise and lower the oscillating frame 78 carrying the glue-applying rollers 76.

The frame 81 of the relatively stationary glue-applying rollers 82 is composed of spaced longitudinal bars hung from the shaft 80 and a cross-bar 92 which is connected to the lower end of a vertical hanger 93, the upper extremity of which latter is fixed to a sleeve 94 loosely mounted on the center of shaft 86. The glue-applying rollers 82 are fixed to the ends of a transverse shaft 95 journaled in bearings on the longitudinal bars of the frame 81 and having its central portion connected by sprocket chain gearing 96 to a transverse shaft 97 journaled in suitable bearings 98, which latter also support the shaft 80, see Fig. 7. The shafts 80 and 97 are connected together by meshing gears 99 and one end of the shaft 80 is connected by sprocket chain gearing 100, Fig. 1ª, to a transverse counter shaft 101 journaled in suitable bearings upon the lower side-bars of the main frame. This counter shaft 101 is connected by sprocket chain gearing 102, Figs. 2 and 2ª, to the main drive shaft 8, from which it derives its motion, and it is further connected by sprocket chain gearing 103 to the counter shaft 50 to which latter it imparts motion. Owing to these driving connections, when the machine is in operation, the shaft 80 will be driven and will impart its motion through gearing 99 to the shaft 97, which latter, through the sprocket chain gearing 96, will impart motion to the shaft 95 of the glue-applying rollers 82. Said shaft 97 will also impart its motion to the shafts 77 of the oscillating glue-applying rollers 79 through sprocket chain gearing 104 which connects the outer ends of shafts 77 to the shaft 97, see Fig. 7.

The glue-applying rollers 76 and 82 are covered with rubber or other material, as indicated at 105 in Fig. 8, and glue is applied to the surfaces of these rubber-covered rollers by means of feed-rollers 106, which are mounted on the shaft 80 and dip into the glue tank 70, see Fig. 8. Wiping devices 107 engage the peripheries of the glue-feeding rollers 106 to wipe off the surplus glue and said wipers are carried by slides 108 mounted in suitable guides and adjusted by means of screws 109, as clearly shown in Figs. 7 and 8.

Means are provided for supporting the side-flaps of the cartons while the glue is being applied to them by the glue-applying rollers 76, 82, which means are here shown in the form of flap-supporting rollers 76$^a$ and 82$^a$, respectively, as shown more clearly in Fig. 10. These flap-supporting rollers are preferably corrugated as shown and they are also adjustably mounted. The rollers 76$^a$ for the outer side-flaps are journaled on stub shafts carried by bracket plates 67$^a$ which are adjustably clamped on the inner faces of the bars 67 by means of clamping bolts 67$^b$. The rollers 82$^a$, which support the inner side-flaps of the cartons, are journaled on stud shafts carried by the ends of a cross-bar 81$^b$, which is vertically adjustable on rods 81$^a$ depending from the stationary glue-roller supporting frame 81. The adjustment of the bar 81$^b$ is effected by forming it with openings to receive the rods or hangers 81$^a$ and providing set screws 81$^c$ which are carried by the bar 81$^b$ and impinge against the rods 81$^a$, see Fig. 23.

As the cartons are carried under the parts 68, 69 their end-flaps will be held in inwardly-folded position and their side-flaps in outwardly-opened position so that glue will be applied to the proper portions of the inner and outer side-flaps as they pass beneath the glue-applying rollers. When the side-flaps leave the glue-applying rollers the flaps are elevated to vertical positions by means of elevating members 110, and they are then successively folded downwardly and inwardly by outer and inner side-flap-folding members 111 and 112, see Figs. 2$^a$ and 20. The members 110, 111 and 112 are in the form of curved or cam-shaped rods, as shown more clearly in Figs. 8 and 20, said rods being bolted, as shown at 113, to an elevated cross-bar 114. The folders 111 for the outer side-flaps are comparatively short and so shaped and arranged that said outer side-flaps, with the glue applied only to their end portions, will be first folded down upon the end-flaps and the inner side flaps, with the glue applied to their entire upper surface, will then be folded by the members 112 down upon the folded outer side-flaps.

When the cartons leave the folders 112, they pass beneath a series of sealing rollers 115. These rollers are arranged adjacent the ends of transverse shafts 116, the extremities of which are removably journaled in bearing notches formed in the upper edges of longitudinal supporting-bars 117. To permit the rollers 115 to be adjusted to the size of the cartons handled by the machine, they are vertically adjustable. As here shown, this is secured by making the supporting-bars 117 vertically adjustable and providing them with clamping bolts 118 which pass through vertical slots 119 on the upright portions of certain of the U-shaped frame members 62.

Any means may be provided for receiving the finished cartons as they pass from beneath the rearmost sealing rollers 115 and out the rear end of the frame, but I preferably curve the guiding bars or rails 63—64 laterally in an outward direction as indicated at 120 in Fig. 2, so that the cartons will be pushed laterally on to suitable moving conveyers, not illustrated.

If desired, I may employ, in connection with the carton-feeding belts 22, manually-operated stop devices, such as shown in Fig. 21, wherein 121 denotes an angular stop arm carried by one end of the lever 122 pivoted at 123 and having a handle at its free end. The lever 122 is adapted to be swung in a horizontal plane to move the lower angular end of the stop arm 121 into and out of the path of the cartons which are fed rearwardly by the belts 22, Fig. 2$^a$. When the stop arm 121 is in the position shown in Fig. 21, the feed of cartons by the belts 22 against the stops 61 will be prevented. When the operator desires the feed to be resumed, the lever 122 is oscillated to swing the stop 121 out of the path of the cartons.

In operation, it will be seen that when power is applied to either end of the main shaft 8, the main conveyer 5 will be actuated and the motion of the latter will be imparted to the carton-feeding belts 22. The motion of the main shaft 8 will be imparted to the shafts 101 and 50, respectively, the motion of the shaft 101 being imparted by means of the sprocket chain gearing 100 to the glue-applying mechanism. From the shaft 50 will be driven the lateral-shifting members which feed the cartons from the belts 22 on to the supporting plates 19 in advance of the followers on the main conveyer 5, and from said main shaft 50 will also be driven the cam shaft 86 of the frame carrying the oscillating glue-applying rollers, and the shaft 72 of the second end-flap folders. The cartons on the belts 22 are carried rearwardly against the stops 61, and at the proper time the two shifting members or plates 35 are simultaneously actuated in an inward direction to shift two cartons from the belts 22 on to the supporting plates 19 in advance of the follower arms 15 on the advancing follower of the main conveyer. The cartons are then carried through the machine by the followers and their end-flaps are successively folded, their side-flaps glued and successively folded and all of the flaps pressed down by the sealing rollers so that the finished cartons are discharged at the rear end of the machine. The folding operation of the flaps of the cartons will be readily understood on reference to the diagrammatic view in Fig. 22.

From the foregoing, it will be seen that by reason of the continuous passage of two streams of cartons through the machine, the latter will have a large output and at the same time may be operated at a comparatively small cost and with little effort on the part of the operator, the machine being entirely automatic in operation. By constructing and arranging the parts so that they may be adjusted with respect to each other, cartons of different sizes may be effectively handled by the machine and by reason of the peculiar construction of the oscillatory frame of the glue-applying mechanism, all danger of glue reaching the contents of the cartons will be eliminated. The improved means for supporting and feeding the cartons beneath the folding and gluing mechanism insures a regular feed of two streams of cartons through the machine, thereby rendering it reliable in operation and also giving it a large capacity as stated above.

While I have shown and described in detail the preferred embodiment of my invention, it will be understood that changes in the form, proportion and arrangement of parts and in the details of construction may be resorted to within the spirit and scope of the claimed invention.

What is claimed is—

1. In a machine of the character described, the combination of a carton-flap-securing devices, with two parallel carton-supporting and guiding channels for directing cartons past said devices, uniformly-spaced followers in said channels, a continuously-moving conveyer simultaneously advancing the followers in both of said channels, and means feeding cartons in front of said followers.

2. In a machine of the character described, the combination of two parallel guide-ways or channels, each consisting of a stationary bottom plate and side walls or rails, for supporting and guiding the cartons, a conveyer arranged to travel in a plane between said guide-ways, uniformly-spaced followers on said conveyer and moving in said guide-ways, carton-flap-securing devices past which the cartons are directed by said guide-ways, and means feeding cartons to said guide in front of said followers.

3. In a machine of the character described, the combination of carton-flap-securing devices, with two parallel carton-supporting and guiding channels for directing cartons past said devices, a conveyer chain moving between said channels, uniformly-spaced followers carried by said chain and moving in each of said channels, and means feeding cartons in front of said followers.

4. In a machine of the character described, the combination of carton-flap-securing devices, with two parallel carton-supporting and guiding channels for directing cartons past said devices, a conveyer chain moving between said channels, guide lugs on said chain moving in grooves beneath said channels, uniformly-spaced followers on said chain moving in each of said channels, and means feeding cartons in front of said followers.

5. In a machine of the character described, the combination of a carton-supporting and guiding channel by which alone the cartons are supported and guided, a conveyer moving cartons along said channel, means opening the side flaps of the cartons, means applying an adhesive to a portion only of the upper surface of one of the opened side flaps, and means folding the side flaps to closed position.

6. In a machine of the character described, the combination of a carton-supporting and guiding channel, a conveyer moving cartons along said channel, means opening the side flaps of the cartons, means applying an adhesive to the entire upper surface of one of the opened side flaps and to a portion only of the upper surface of the other opened side flap, and means folding the side flaps to closed position.

7. In a machine of the character described, the combination of a carton-supporting and guiding channel, a conveyer moving cartons along said channel, means opening the side flaps of the cartons, an adhesive-applying roller intermittently contacting with the upper surface of one of said opened side flaps, and means folding the side flaps to closed position.

8. In a machine of the character described, the combination of a carton-supporting and guiding channel, a conveyer moving cartons along said channel, means opening the side flaps of the cartons, an adhesive-applying roller continuously contacting with the upper surface of one of said opened side flaps during its passage under the roller, an adhesive-applying roller intermittently contacting with the upper surface of the other of said opened side flaps, and means folding the side flaps to closed position.

9. In a machine of the character described, the combination of carton-flap-securing devices, with two parallel carton-supporting and guiding channels for directing cartons past said devices, a single conveyer carrying a plurality of uniformly-spaced followers moving in both of said channels, a plurality of feeding or carton-supplying conveyers presenting cartons to the receiving ends of said channels, and means shifting the cartons from said feeding conveyers to said channels in front of said followers.

10. In a machine of the character described, the combination of carton-flap-securing devices, with two parallel carton-supporting and guiding channels for directing cartons past said devices, a single conveyer, uniformly-spaced followers in each of said channels and secured to said conveyer, two feeding or carton-supplying belts, one for each of said channels and presenting cartons to one side of the receiving end of each channel, and means shifting the cartons from said feeding belts to said channels in front of said followers.

11. In a machine of the character described, the combination of carton-flap-securing devices, with two parallel carton-supporting and guiding channels for directing cartons past said devices, a single conveyer, uniformly-spaced followers in each of said channels and secured to said conveyer, two feeding or carton-supplying belts, one for each of said channels and presenting cartons to one side of the receiving end of each channel, and shifting means consisting of transversely-reciprocating elements pushing the cartons from said feeding belts to said channels in front of said followers.

12. In a machine of the character described, the combination of a carton-guiding and supporting channel and means advancing cartons therethrough, with carton flap-securing devices including an adhesive-supplying roller, a vertically reciprocating frame in which said roller is mounted to turn, a feed roller supplying adhesive to said first roller and mounted on a non-reciprocating axis, and means supplying adhesive to said feed roller.

13. In a machine of the character described, the combination of parallel carton-supporting and feeding mechanisms, horizontally arranged folder plates in the path of cartons on said feeding mechanisms provided with notches in their ends for folding down the forward end flaps, and rotating disks having notched peripheries operating in the notches of the plates to fold down the rear end flaps.

14. In a machine of the character described, the combination of parallel carton-supporting and feed mechanisms, horizontally arranged tapering folder plates in the path of cartons on said feeding mechanisms, notched in their ends and extended laterally to a width greater than a carton, whereby they fold down the front end flaps and open out and hold down the side flaps, and rotating notched disks operating in the notches of the plates to turn down the rear end flaps.

15. In a machine of the character described, the combination of means for supporting, guiding and feeding a carton, a taper-ended plate in the path of the end flaps of the carton wider than the carton for folding down the forward end flap and opening and holding down the side flaps, means for folding down the rear end flap, and means for applying glue to part of one side flap and the whole of the other side flap while held down.

16. In a machine of the character described, the combination of means for supporting, guiding and feeding a carton, a taper-ended plate in the path of the end flaps of the carton wider than the carton for folding down the forward end flap and opening and holding down the side flaps, means for folding down the rear end flap, and means for applying glue to part of one side flap and the whole of the other side flap while held down comprising parallel glue rollers, one of which is continuously in operative position, and means for intermittently raising the other out of operative position.

17. In a machine of the character described, the combination of a supporting frame, carton-supporting plates, a main conveyer to travel between said plates and provided with followers, each of the latter having carton-engaging-follower wings to travel over said plates, means for feeding cartons on said plates in advance of the follower wings, tapered horizontally-arranged end-flap-folding and side-flap-spreading members, end folding members, means for applying glue over the entire surface of one of the side flaps of each carton, and to the end portions only of the other side flaps of each carton, means for successively folding the side flaps of the cartons, and a series of sealing rollers to engage the folded cartons.

18. In a machine of the character described, the combination of means for supporting and guiding a stream of cartons, means for feeding cartons through the same, means for folding the side flaps of the cartons outwardly and maintaining them in outwardly folded position, a supporting frame, a glue-applying roller mounted in said frame to apply glue to the entire surface of one side flap, a vertically oscillating frame, a glue-applying roller carried by the latter and adapted to apply glue to the end portion only of the other side flaps, means for supplying said rollers with glue, and means for oscillating said oscillatory frame.

19. In a machine of the character described, the combination of a supporting frame, means for moving cartons through the same, a transverse shaft journaled upon the frame, a second transverse shaft operatively connected to the first mentioned shaft, an oscillatory frame hung from the first mentioned shaft, a cam mechanism for oscillating said oscillatory frame, glue-applying rollers journaled in said oscillatory frame and driven from the second mentioned shaft, non-oscillatory glue-applying rollers also driven from the second mentioned shaft, a stationary supporting frame for the last mentioned rollers, a glue tank, and glue-feeding rollers mounted on the first mentioned shaft and arranged to convey glue from the tank to said glue-applying rollers.

20. In a machine of the character described, the combination of a supporting frame, means for moving cartons through the same, a glue-applying roller, an oscillatory frame, a second glue-applying roller carried by said frame for applying glue to portions only of one flap of the cartons, and flap-supporting rollers co-acting with the glue-applying rollers.

21. In a machine of the character set forth, the combination of a supporting frame, means for carrying two streams of cartons through the same, means for applying glue to the flaps of cartons, said means including oscillatory rollers and an oscillatory frame carrying the same, and adjustably mounted corrugated flap supporting rollers to coact with said glue-applying rollers.

22. In a machine of the character described, the combination of a pair of glue-applying rollers, one being relatively stationary and the other mounted for oscillatory movement, means for feeding cartons past said rollers, and means for supporting the flaps of the cartons while glue is being applied to them by said rollers.

In testimony whereof I have signed this specification in the presence of two subscribing witnesses.

FRANK B. MARTIN.

Witnesses:
B. F. REID,
PERRY SUTTON.